(12) United States Patent
Yokoi et al.

(10) Patent No.: US 8,177,427 B2
(45) Date of Patent: May 15, 2012

(54) TEMPERATURE SENSOR AND METHOD OF PRODUCING THE SAME

(75) Inventors: Hitoshi Yokoi, Aichi (JP); Tomimasa Ito, Seto (JP); Tatsuya Suzuki, Nagoya (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 712 days.

(21) Appl. No.: 12/343,806

(22) Filed: Dec. 24, 2008

(65) Prior Publication Data

US 2009/0168842 A1 Jul. 2, 2009

(30) Foreign Application Priority Data

Dec. 26, 2007 (JP) .............................. P2007-333737
Nov. 25, 2008 (JP) .............................. P2008-299600

(51) Int. Cl.
*G01K 1/08* (2006.01)
(52) U.S. Cl. ...................................................... 374/208
(58) Field of Classification Search .................... 374/208
See application file for complete search history.

(56) References Cited

U.S. PATENT DOCUMENTS

| | | | | |
|---|---|---|---|---|
| 4,448,547 A * | 5/1984 | Wickersheim | ................. | 374/131 |
| 5,142,266 A | 8/1992 | Friese et al. | | |
| 5,318,363 A * | 6/1994 | Mauric | ......................... | 374/208 |
| 7,997,795 B2 * | 8/2011 | Schwagerman et al. | ....... | 374/179 |
| 2004/0218662 A1 | 11/2004 | Hanzawa et al. | | |
| 2007/0252672 A1 * | 11/2007 | Nyffenegger | ................... | 338/28 |
| 2009/0129435 A1 * | 5/2009 | Lin et al. | ........................ | 374/121 |
| 2010/0091814 A1 * | 4/2010 | Kuntz et al. | .................... | 374/147 |
| 2011/0007776 A1 * | 1/2011 | Yamamoto | ..................... | 374/208 |

FOREIGN PATENT DOCUMENTS

| | | |
|---|---|---|
| JP | 2000-234962 | 8/2000 |
| JP | 2000-266609 | 9/2000 |
| JP | 2004-301679 | 10/2004 |
| JP | 2005-055254 | 3/2005 |
| JP | 2007-170952 | 7/2007 |

OTHER PUBLICATIONS

EPO, Extended European Search Report for corresponding European application No. 08022169.0, issued Feb. 1, 2012.

* cited by examiner

*Primary Examiner* — Christopher Fulton
(74) *Attorney, Agent, or Firm* — Stites & Harbison PLLC; Jeffrey A. Haeberlin (57) ABSTRACT

A temperature sensor is provided. The temperature sensor includes: a temperature sensitive element having a temperature sensitive body and an element electrode wire; a sheath member having an external cylinder, the sheath member encompassing a sheath core wire to be bonded to the element electrode wire in the external cylinder; an enclosing member having a bottom-closed cylindrical shape extending in an axial direction, at least the temperature sensitive element and a bond portion of the element electrode wire and the sheath core wire being accommodated in an internal space of the bottom-closed cylindrical shape, and a holding member that is filled in the internal space, wherein an air gap is provided at least between an outer surface of the temperature sensitive body and the holding member so as to permit displacement of the temperature sensitive body in a direction intersecting the axial direction of the enclosing member.

7 Claims, 6 Drawing Sheets

TEMPERATURE SENSOR AND METHOD OF PRODUCING THE SAME

CROSS REFERENCE TO RELATED APPLICATION

The present application claims priority from Japanese Patent Application No. 2007-333737, which was filed on Dec. 26, 2007, and from Japanese Patent Application No. 2008-299600, which was filed on Nov. 25, 2008, the disclosures of which are herein incorporated by reference in their entirety.

TECHNICAL FIELD

The present invention relates to a temperature sensor having a temperature sensitive element, such as a thermistor element or a Pt resistive element, and to a method of producing a temperature sensor.

BACKGROUND

As a temperature sensor for detecting the temperature of exhaust gas in an automotive engine, for example, Patent Documents 1 to 5 disclose related temperature sensors.

Figure 6A:
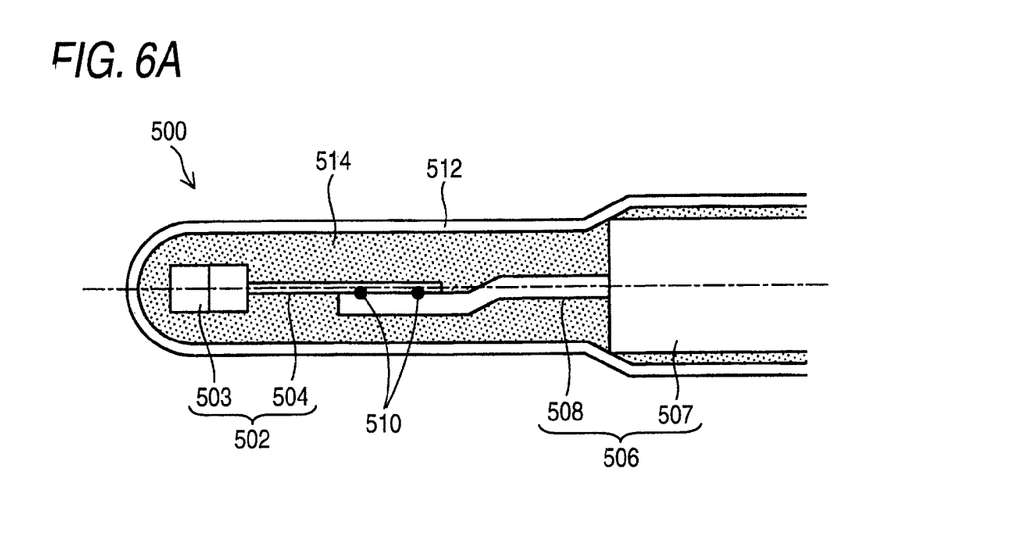
FIGS. 6A to 6C are sectional views showing the configuration of a related temperature sensor.
Figure 6B:
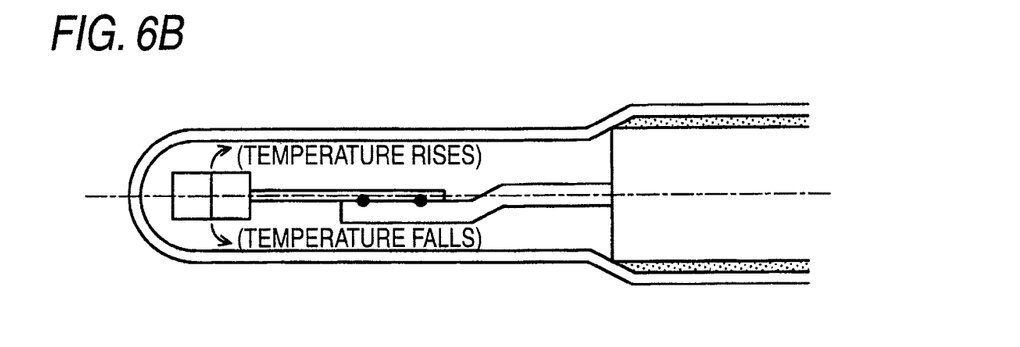
Figure 6C:
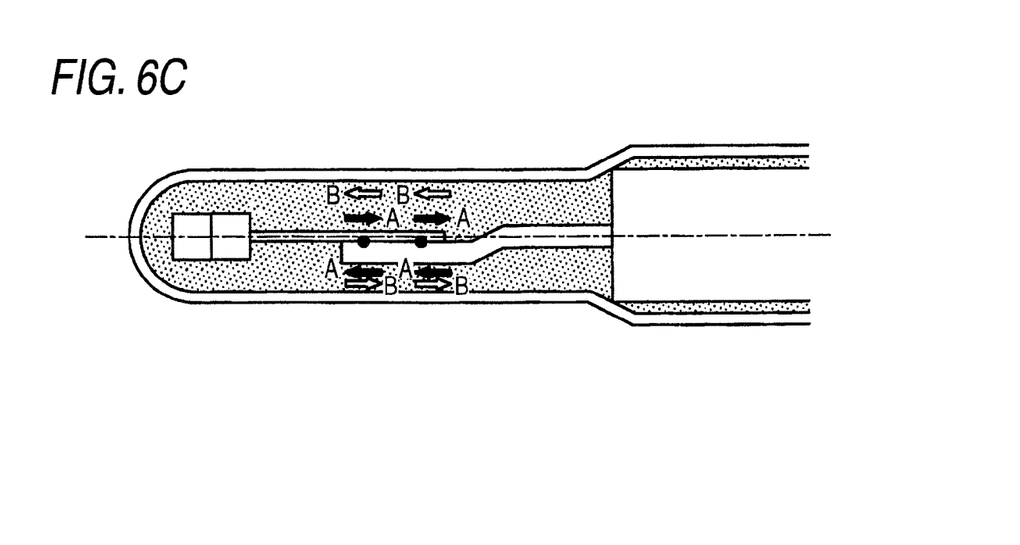

FIGS. 6A to 6C are sectional views showing the configuration of a related temperature sensor, focusing on a metal tube 512. As shown in FIG. 6A, a temperature sensor 500 includes a thermistor element 502 that has a thermistor sintered body 503 and an element electrode wire 504, and a sheath member 506 that holds a sheath core wire 508 in a sheath pipe 507 in a state where electrical insulation is provided between the sheath pipe 507 and the sheath core wire 508. The element electrode wire 504 extending from the thermistor sintered body 503 is laser spot-welded to the sheath core wire 508 which extends from a front end of the sheath pipe 507. The thermistor element 502 and the sheath core wire 508 connected to the element electrode wire 504 are accommodated in the metal tube 512 made of a stainless alloy. Insulating cement 514 made of thermally resistant oxide ($Al_2O_3$ [alumina] or the like) is filled in the internal space of the metal tube 512 to function as a holding member for suppressing shaking of the thermistor element 502 due to vibration.

The temperature of exhaust gas may vary over a wide range from a low temperature of −40° C. to a high temperature of 1000° C. For this reason, the temperature sensor 500 may be used to detect temperature in such a wide temperature range. Accordingly, the temperature sensor 500 is exposed to the environment of a cooling/heating cycle at low/high temperature.

[Patent Document 1] JP-A-2005-55254
[Patent Document 2] JP-A-2004-301679
[Patent Document 3] JP-A-2000-266609
[Patent Document 4] JP-A-2000-234962
[Patent Document 5] JP-A-2007-170952

SUMMARY

The element electrode wire 504 of the thermistor element 502 is made of Pt or Pt/Rh alloy having high thermal resistance and low electrical resistance, and the sheath core wire 508 is made of stainless or Inconel in terms of thermal resistance, strength, and cost. The element electrode wire 504 and the sheath core wire 508 laser spot-welded are made of different materials, and accordingly they have different thermal expansion coefficients. For this reason, if it is assumed that cement 514 is not filled in the metal tube 512, as shown in FIG. 6B, the element electrode wire 504 from a bond portion 510 of the element electrode wire 504 and the sheath core wire 508 to the thermistor sintered body 503 is bent in accordance with a change in temperature, and the thermistor sintered body 503 is displaced.

However, as shown in FIG. 6A, since cement 514 is filled in the metal tube 512 in which the thermistor element 502 is accommodated, the element electrode wire 504 cannot be bent, and the thermistor sintered body 503 cannot be displaced. For this reason, as shown in FIG. 6C, shearing stress is applied to the bond portion 510 of the element electrode wire 504 and the sheath core wire 508, as indicated by an arrow A (when temperature rises) or an arrow B (when temperature falls).

As described above, if shearing stress is repeatedly applied to the bond portion 510 of the element electrode wire 504 and the sheath core wire 508, the bond portion 510 may be broken or separated, and the detection output of the thermistor element 502 may not be extracted to the outside.

Various compositions are suggested for the thermistor sintered body of the thermistor element, and some thermistor sintered bodies have a composition which contains a component reacting with water. With respect to a thermistor element having such a thermistor sintered body, it is difficult to use water-based cement as cement serving as a holding member to be filled in the metal tube. Even if water-based cement is used, immediately after cement is filled, it is necessary to dry cement in order to prevent the thermistor sintered body from reacting with water.

The invention has been proposed in order to solve the above-described problems, and it is an object of the invention to reduce stress to be applied to the bond portion of the element electrode wire of the thermistor element and the sheath core wire, thereby preventing the bond portion from being broken or separated. It is another object of the invention to enable use of water-based cement serving as a holding member for securing vibration resistance.

The invention has been finalized in order to achieve at least one of the above-described objects, and may be embodied by the following aspects.

[First Aspect]

A temperature sensor includes a temperature sensitive element that has a temperature sensitive body and an element electrode wire, a sheath member that encompasses a sheath core wire to be bonded to the element electrode wire in an external cylinder, an enclosing member that has a bottom-closed cylindrical shape extending in an axial direction with a front end closed, at least the temperature sensitive element and a bond portion of the element electrode wire and the sheath core wire being accommodated in an internal space of the bottom-closed cylindrical shape, and a holding member that is filled in the internal space. An air gap is provided at least between an outer surface of the temperature sensitive body and the holding member to permit displacement of the temperature sensitive body in a direction intersecting the axial direction of the enclosing member.

In the temperature sensor according to the first aspect, an air gap is provided at least between the outer surface of the temperature sensitive body and the holding member. For this reason, a shaking prevention effect of the temperature sensitive element is secured by the holding member, as compared with a case in which no holding member is provided. In addition, even if a cooling/heating cycle is repeatedly generated in the temperature sensor, the temperature sensitive body can be displaced (moved) by the amount corresponding to the air gap in the direction intersecting the axial direction of the enclosing member. Therefore, stress to be applied the bond portion of the element electrode wire and the sheath core wire can be reduced, and as a result, the bond portion can be prevented from being broken or separated.

[Second Aspect]

In the temperature sensor according to the first aspect, an air gap may be provided between the outer surface of the temperature sensitive body and the holding member, and between the holding member and outer surfaces of the element electrode wire and the sheath core wire from the temperature sensitive body to the bond portion so that the air gap permits displacement of the temperature sensitive body and the element electrode wire in the direction intersecting the axial direction of the enclosing member.

In the temperature sensor according to the second aspect, the air gap is provided between the outer surface of the temperature sensitive body and the holding member, and between the holding member and the outer surfaces of the element electrode wire and the sheath core wire from the temperature sensitive body to the bond portion. Even if a cooling/heating cycle is repeatedly generated in the temperature sensor, the temperature sensitive body and the element electrode wire can be displaced (moved) by the amount corresponding to the air gap in the direction intersecting the axial direction of the enclosing member. Therefore, stress to be applied to the bond portion of the element electrode wire and the sheath core wire can be more reduced, as compared with the temperature sensor according to the first aspect, and as a result, the bond portion can be prevented from being broken or separated.

[Third Aspect]

In the temperature sensor according to the first or second aspect, an enclosing air gap may be provided between an entire outer surface of the temperature sensitive body and the holding member, and the enclosing air gap may include the air gap.

If a cooling/heating cycle is repeatedly generated in the temperature sensor, the enclosing member also expands and contracts. When the enclosing member contracts, an inner surface of the enclosing member presses the holding member, and the holding member presses the temperature sensitive body. According to the temperature sensor of the third aspect, since the enclosing air gap is provided, even if the enclosing member contracts and presses the holding member, a pressing force of the holding member against the temperature sensitive body can be reduced, as compared with a case in which no enclosing air gap is provided. Therefore, even if the enclosing member expands or contracts due to the cooling/heating cycle, a pressing force of the holding member against the temperature sensitive body can be reduced, and thus stress to be applied to the bond portion of the element electrode wire and the sheath core wire due to the pressing force can be reduced. In addition, the enclosing air gap includes the air gap that permits displacement of the temperature sensitive body in the direction intersecting the axial direction of the enclosing member. As a result, in addition to the effects of the first and second aspects, it is possible to provide a temperature sensor that can more reliably prevent the bond portion from being broken or separated.

[Fourth Aspect]

There is provided a method of producing a temperature sensor. The temperature sensor includes a temperature sensitive element that has a temperature sensitive body and an element electrode wire, a sheath member that encompasses a sheath core wire to be bonded to the element electrode wire in an external cylinder, an enclosing member that has a bottom-closed cylindrical shape with a front end closed, at least the temperature sensitive element and a bond portion of the element electrode wire and the sheath core wire being accommodated in an internal space of the bottom-closed cylindrical shape, and a holding member that is filled in the internal space. The method includes coating a combustible material at least on an outer surface of the temperature sensitive body, bonding the element electrode wire of the temperature sensitive element with the temperature sensitive body coated with the combustible material and the sheath core wire of the sheath member, accommodating at least the temperature sensitive element and bond portion of the element electrode wire and the sheath core wire in the internal space of the enclosing member, and filling the unsolidified holding member in the internal space of the enclosing member, solidifying the unsolidified holding member by heating, and burning out the combustible material to provide an air gap at least between the outer surface of the temperature sensitive body and the holding member.

[Fifth Aspect]

There is provided a method of producing a temperature sensor. The temperature sensor includes a temperature sensitive element that has a temperature sensitive body and an element electrode wire, a sheath member that encompasses a sheath core wire to be bonded to the element electrode wire in a metallic external cylinder in a state of being insulated, an enclosing member that has a bottom-closed cylindrical shape with a front end closed, at least the temperature sensitive element and a bond portion of the element electrode wire and the sheath core wire being accommodated in an internal space of the bottom-closed cylindrical shape, and a holding member that is filled in the internal space. The method includes bonding the element electrode wire of the temperature sensitive element and the sheath core wire of the sheath member, coating a combustible material on at least an outer surface of the temperature sensitive body of the temperature sensitive element after the bonding, accommodating at least the temperature sensitive element and the bond portion of the element electrode wire and the sheath core wire in the internal space of the enclosing member, and filling the unsolidified holding member in the internal space of the enclosing member, solidifying the unsolidified holding member by heating, and burning out the combustible material to provide an air gap at least between the outer surface of the temperature sensitive body and the holding member.

According to the methods of producing a temperature sensor of the fourth and fifth aspects, a temperature sensor that is provided with the air gap at least between the outer surface of the temperature sensitive body and the holding member can be efficiently produced. In addition, while the unsolidified holding member is being solidified by heating, the combustible material is interposed between the temperature sensitive body and the holding member. Therefore, the combustible material can prevent the temperature sensitive body from being influenced by the unsolidified holding member, and water-based cement can be used as the holding member. That is, choices of a material for the holding member can be increased, and production management can be facilitated. As a result, a temperature sensor can be efficiently produced.

[Sixth Aspect]

In the method according to the fifth aspect, in the coating of the combustible material, the combustible material may be coated on the outer surface of the temperature sensitive body, an outer surfaces of the element electrode wire and the sheath core wire from the temperature sensitive body to the bond portion, and in the providing of the air gap, the combustible material may be burned out to provide the air gap between the outer surface of the temperature sensitive body and the holding member, and between the holding member and outer surfaces of the element electrode wire and the sheath core wire from the temperature sensitive body to the bond portion.

According to the method of the sixth aspect, it is possible to efficiently produce a temperature sensor that is provided with the air gap between the outer surface of the temperature sensitive body and the holding member and between the holding member and the outer surfaces of the element electrode wire and the sheath core wire from the temperature sensitive body to the bond portion.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

An exemplary embodiment of the invention will now be described in connection with Examples in the following sequence.
A. First Example:
  A1. Structure of Temperature Sensor:
  A2. Producing Process of Temperature Sensor:
B. Second Example:
  B1. Structure of Temperature Sensor:
  B2. Producing Process of Temperature Sensor:
C. Modification:

A. First Example

A1. Structure of Temperature Sensor

Figure 1:
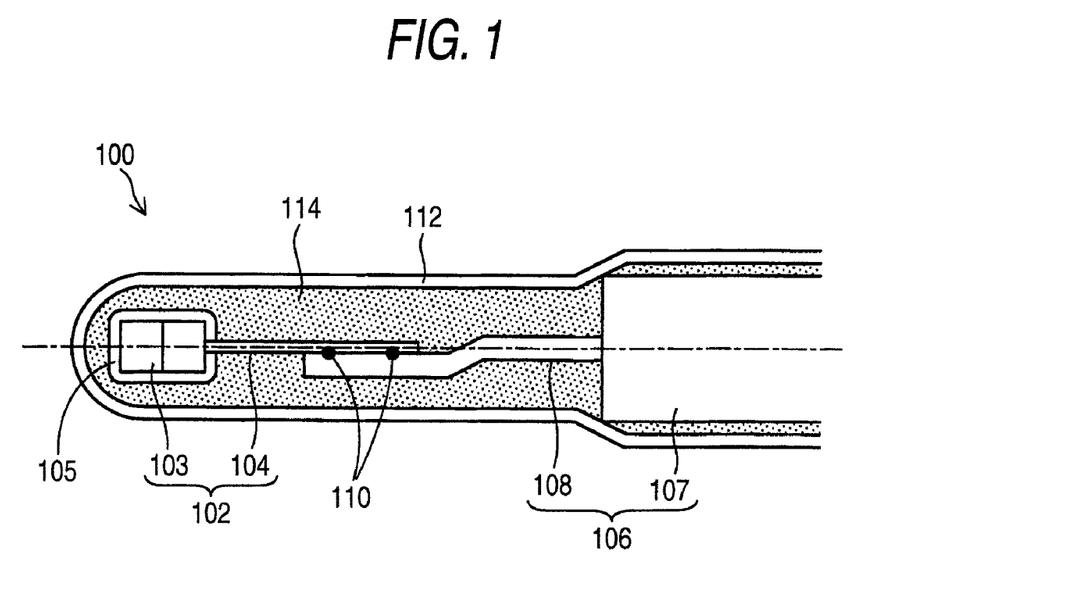
FIG. 1 is an explanatory view showing the configuration of parts of a temperature sensor according to a first example of the invention.
Figure 2:
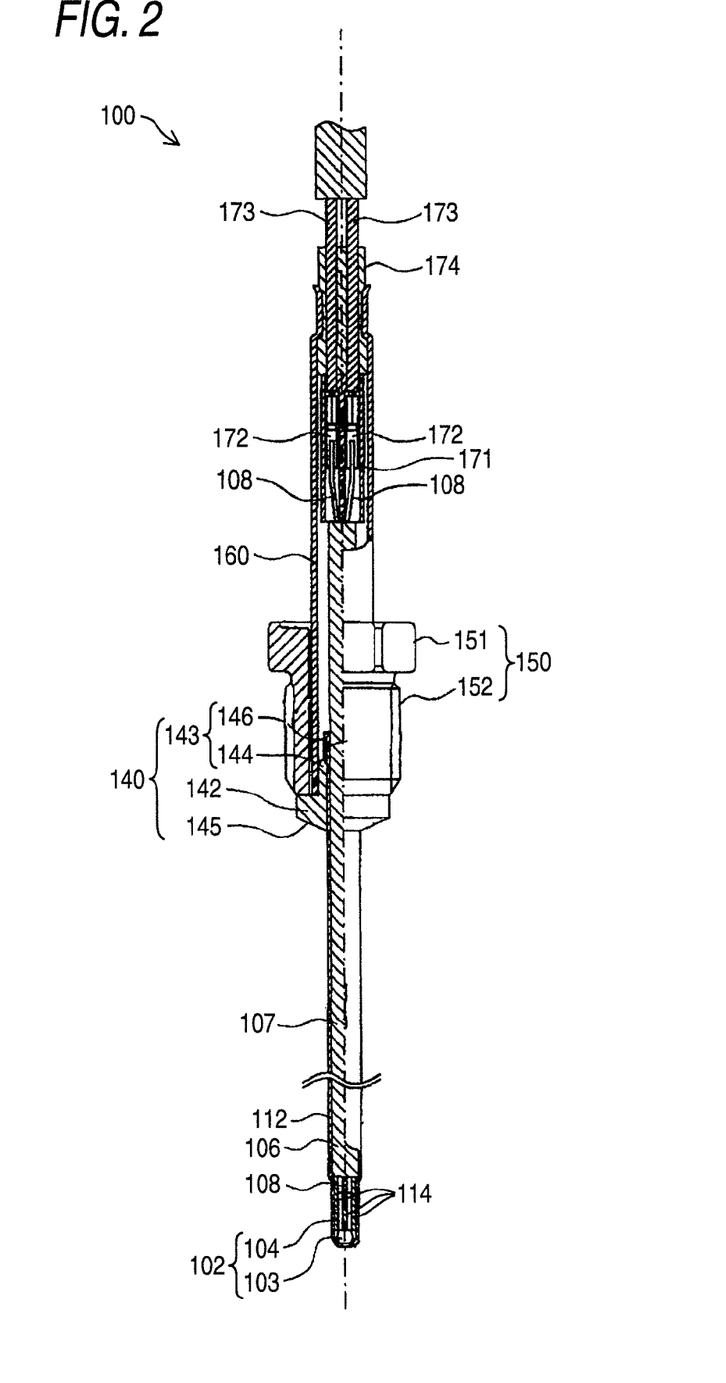
FIG. 2 is an explanatory view showing the overall configuration of the temperature sensor of the first example.

FIG. 1 is an explanatory view showing the configuration of parts of a temperature sensor according to a first example of the invention, focusing only a metal tube 112. FIG. 2 is an explanatory view of the overall configuration of a temperature sensor according to the first example, focusing a part thereof. FIGS. 1 and 2 shows one of two element electrode wires 104 and correspond to an enlarged view of parts taken along a plane parallel to the center of a temperature sensor 100 in a direction perpendicular to the paper.

A temperature sensor 100 of this example is used to detect temperature of exhaust gas in an automotive engine. Therefore, the temperature sensor 100 is exposed to the environment of cooling/heating cycle in which temperature changes over a wide range from a low temperature of −40° C. to a high temperature of 1000° C.

First, as shown in FIG. 2, in the temperature sensor 100, a thermistor element 102 is provided at a front end of a bottom-closed cylindrical metal tube 112 which extends along the axis (indicated by a one-dot-chain line). A rear end of the metal tube 112 is open, and the rear end is press-fitted in a flange member 140. The flange member 140 includes a cylindrical shell 143 that extends along the axis (indicated by an one-dot-chain line), and a flange 142 that is located at a front end of the shell 143 and has an outer diameter larger than the shell 143 to protrude radially outwardly from the shell 143. The flange member 140 also includes a tapered seat surface 145 that is formed at a front end of the flange 142 to seal a mount portion of an exhaust pipe, through which exhaust gas flows. The shell 143 has a two-stepped shape with a first step portion 144 located at the front end and a second step portion 146 smaller in diameter than the first step portion 144.

The metal tube 112 which is press-fitted in the flange member 140 is laser-welded to the second step portion 146 throughout an outer circumferential surface thereof. A cylindrical metallic joint 160 is press-fitted in the first step portion 144 of the flange member 140 and laser-welded throughout the surface. An attachment member 150 is provided with a hexagonal nut 151 and a screw 152 and is rotatably provided around the flange member 140 and the joint 160. The temperature sensor 100 of this embodiment is fixed to the exhaust pipe by bring the seat surface 145 of the flange member 140 into contact with the mount portion of the exhaust pipe and screwing the attachment member 150 into the mount portion.

A sheath member 106 is provided in the metal tube 112, the flange member 140, and the joint 160 and includes two sheath core wires 108 in a sheath pipe 107 in such a manner to establish electrical insulation between the sheath pipe 107 and the sheath core wires 108. The element electrode wire 104 of the thermistor element 102 is laser spot-welded to the sheath core wire 108 which extends from a front end of the sheath pipe 107 of the sheath member 106 in the metal tube 112. Meanwhile, the sheath core wires 108 which extend toward a rear end of the sheath member 106 are connected to two lead wires 173 through crimp terminals 172. Insulating tubes 171 are arranged to provide electrical insulation between the sheath core wires 108 and between the crimp terminals 172. The two lead wires 173 pass through lead wire insertion holes of an elastic seal member 174, which is fitted in the rear end portion of the joint 160, extend to outside of the joint 160, and are connected to an external circuit through a connector.

Next, the parts of the first example will be described with reference to FIG. 1. The thermistor element 10 includes a thermistor sintered body 103 and element electrode wires 104. The thermistor sintered body 103 is made of perovskite-type oxide based on $(Sr,Y)(Al,Mn,Fe,Cr)O_3$. The thermistor sintered body 103 has a hexagonal columnar shape, and two element electrode wires 104 extending from a rear end surface thereof. The element electrode wires 104 are made of Pt/Rh alloy. In the sheath member 106, two sheath core wires 108 made of stainless alloy are arranged in the sheath pipe 107 made of stainless alloy, and an insulating sheath filler is filled in order to hold the sheath core wires 108. The two sheath core wires 108 extend from the front end of the sheath pipe 107. The two element electrode wires 104 of the thermistor element 102 and the two sheath core wires 108 of the sheath member 106 have a circular sectional shape, and the front ends of the corresponding wires overlap and are laser spot-welded. That is, in this embodiment, the element electrode wires 104 and the sheath core wires 108 are made of different materials, and the corresponding wires made of materials having different thermal expansion coefficients are bonded.

The metal tube 112 has a bottom-closed cylindrical shape and is made of stainless alloy. The metal tube 112 accommodates the thermistor element 102, the bond portions 110 by laser spot welding, and a part of the sheath member 106. Cement 114 is made of thermally resistant oxide containing silica with an insulating ceramic component as a main component, specifically, $Al_2O_3$ (alumina). Cement 114 is filled in a space defined by the metal tube 112 so as to hold the thermistor element 102 and the bond portions 110.

In this embodiment, the thermistor element 102 corresponds to a temperature sensitive element in the appended claims, and the thermistor sintered body 103 corresponds to a temperature sensitive body in the appended claims. In addition, the metal tube 112 corresponds to an enclosing member in the appended claims, and cement 114 corresponds to a holding member in the appended claims.

In this embodiment, as shown in FIG. 1, an air gap 105 is provided between an outer surface of the thermistor sintered body 103 and cement 114 to have a predetermined distance (size). With the air gap 105, the following effects can be obtained. In this embodiment, the air gap 105 is provided between the entire outer surface of the thermistor sintered body 103 and cement 114. The air gap 105 includes an air gap which permits displacement of the thermistor sintered body 103 in a direction intersecting an axial direction of the metal tube 112. That is, the air gap 105 of this embodiment corresponds to an air gap in the appended claims, and also corresponds to an enclosing air gap in the appended claims.

In this embodiment, the temperature sensor 100 is exposed to the environment of cooling/heating cycle. Accordingly, as described above, when a change in temperature occurs from low temperature to high temperature or from high temperature to low temperature, a force for bending the element electrode wires 104 and a force for displacing the thermistor sintered body 103 are generated on the basis of a difference in thermal expansion coefficient between the element electrode wires 104 and the sheath core wires 108. In this case, in the related temperature sensor, the thermistor element 102 and the bond portions 110 of the element electrode wires 104 and the sheath core wires 108 are fixed by cement 114 while is filled in the internal space of the metal tube 112. For this reason, the element electrode wires 104 cannot be bent or the thermistor sintered body 103 cannot be displaced, and then if shearing stress is repeatedly applied to the bond portions 110, the bond portions 110 may be broken or separated.

In contrast, as described above, the air gap 105 is provided between the outer surface of the thermistor sintered body 103 and cement 114. Therefore, even if a cooling/heating cycle is repeatedly generated in the temperature sensor 100, the thermistor sintered body 103 can be displaced (moved) in the direction intersecting the axial direction of the metal tube 112. As a result, shearing stress to be applied to the bond portions 110 can be reduced, and thus the bond portions 110 can be prevented from being broken or separated. In addition, a cooling/heating cycle may be repeatedly generated in the temperature sensor 100, the metal tube 112 may expand or contract, and the metal tube 112 may contract and press cement 114. In this case, since the air gap 105 is provided between the entire surface of the thermistor sintered body 103 and cement 114, a pressing force of cement 114 against the thermistor sintered body 103 can be reduced, as compared with a case in which no air gap 105 is provided. From this standpoint, stress to be applied to the bond portions 110 of the element electrode wires 104 and the sheath core wires 108 can be reduced.

A2. Producing Process of Temperature Sensor

The air gap 105 can be provided by the following producing process.

First, the individual members including the thermistor element 102, the sheath member 106, the metal tube 112, the flange member 140, the attachment member 150, the joint 160, the lead wires 173, and the elastic seal member 174 are prepared.

The individual members 102, 106, 112, 140, 150, 160, 173, and 174 are assembled, thereby producing the temperature sensor 100 shown in FIG. 2.

Figure 3:
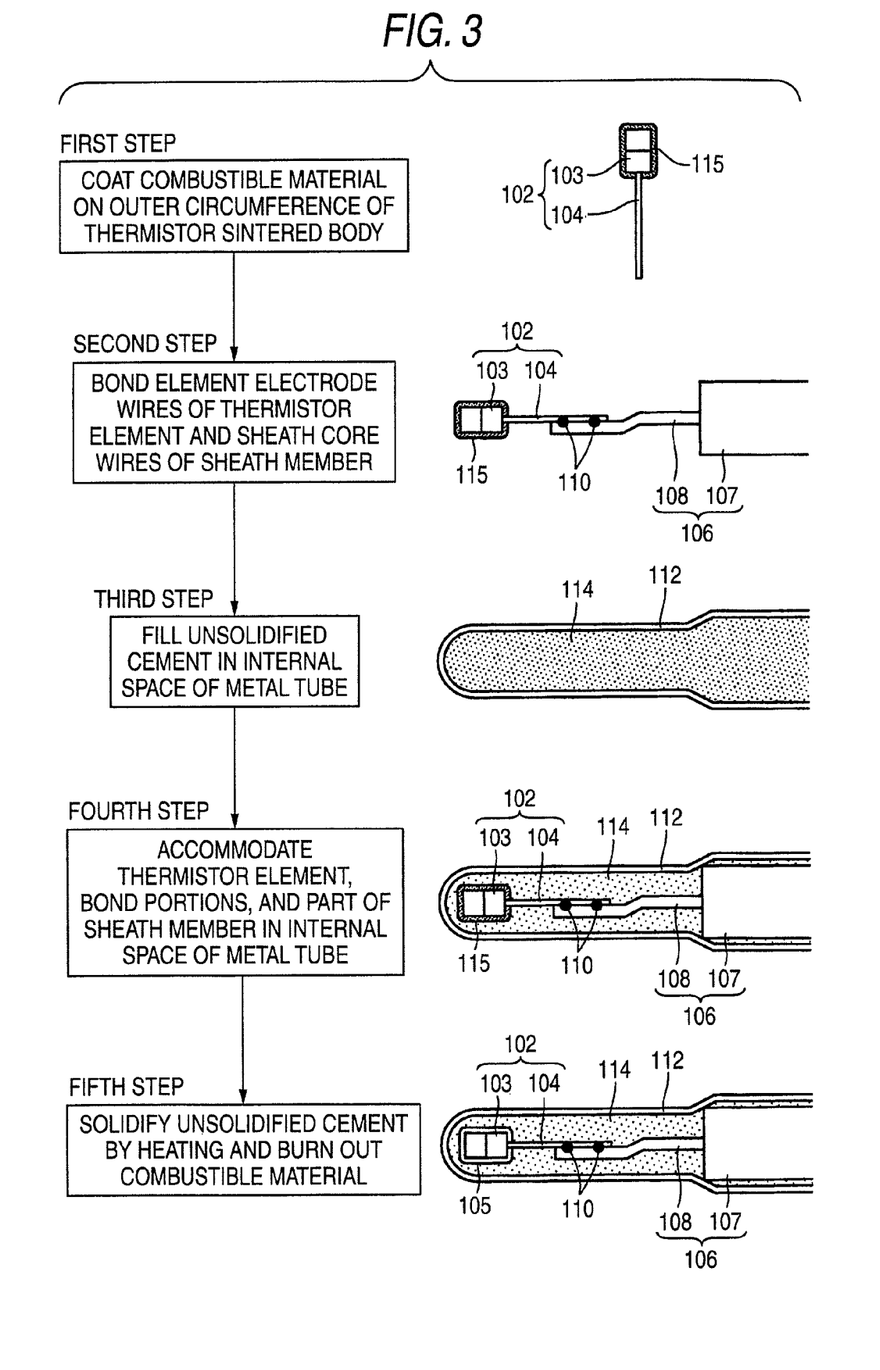
FIG. 3 is a process view showing an assembly process in a producing process of the temperature sensor of the first example.

FIG. 3 is a process view showing a part of an assembly process in a producing process of the temperature sensor of the first example.

First, in a first step, a combustible material is coated on the outer surface of the thermistor sintered body 103 of the thermistor element 102.

Next, in a second step, the element electrode wires 104 of the thermistor element 102 are laser spot welded to the sheath core wires 108 which extend from the front end of the sheath member 106.

Next, in a third step, unsolidified cement 114 is filled in the internal space of the metal tube 112.

Next, in a fourth step, the thermistor element 102, the bond portions 110 by laser spot welding, and apart of the sheath member 106 are accommodated in the internal space of the metal tube 112.

Next, in a fifth step, cement 114 is heated to a solidification temperature to dry and solidify unsolidified cement 114, and the combustible material is burned out. As a result, the air gap 105 can be provided around the thermistor sintered body 103.

The combustible material is not particularly limited insofar as it can be removed (burned out) by combustion. A material which can be completely burned out at the solidification temperature or less of cement 114 is preferably used since solidification of cement 114 and burning out of the combustible material can be performed simultaneously. Specifically, acryl emulsion, polyethylene wax, varnish, latex rubber or the like can be used. In addition, a mixture in which acrylic rubber or polyester resin is dissolved in a solvent can be used. In general, a material not having a high molecular weight and a straight chain is preferably used since graphite rarely remains (the amount of a residual coal component is small), and it is easily burned out by combustion.

A method of coating the combustible material is not particularly limited, dipping, blowing, brushing, or the like may be used. In this case, the thickness of the coating layer can be controlled by adequately selecting the concentration of a combustible material solution, viscosity, the number of times of dipping, a blow rate, the number of times of brushing, or the like. As a result, the size of the air gap to be provided after the coating is burned out can be controlled.

The size of the air gap is not particularly limited. However, since if the size is too large, the thermal conductivity of gas is smaller than the thermal conductivity of cement 114, responsiveness of temperature detection by the thermistor element 102 is deteriorated, and vibration resistance is also deteriorated. Therefore, the size (distance) of the air gap between the thermistor sintered body 103 and cement 114 is preferably a minimum size which permits minute displacement of the thermistor sintered body 103 in accordance with a change in temperature. The minimum size is determined by the material and length of the element electrode wires 104, the material and length of the sheath core wires 108, and the overlap length of the element electrode wires 104 and the sheath core wires 108 in the bond portions. Specifically, the size of the air gap is preferably 0.5 mm or less.

When the coating layer of the combustible material is densely formed or when the coating layer of the combustible material is water-repellant, even if the thermistor sintered body 103 is made of a material which contains a component reacting with water, water-based cement can be used for cement 114 serving as a holding member since the coating layer has a waterproof effect.

B. Second Example

B1. Structure of Temperature Sensor

Figure 4:
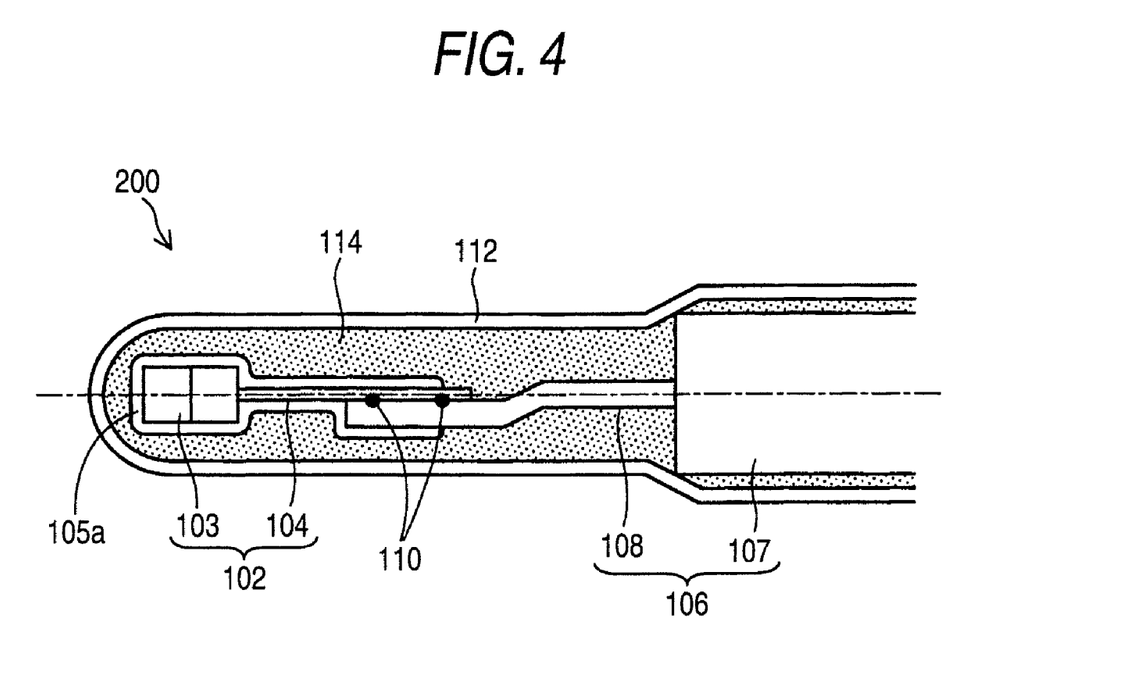
FIG. 4 is an explanatory view showing the structure of parts of a temperature sensor according to a second example of the invention.

FIG. 4 is an explanatory view showing the structure of parts of a temperature sensor according to a second example of the invention, focusing only on the metal tube 112. A difference between a temperature sensor 200 of the second example and the temperature sensor 100 of the first example is as follows. That is, as shown in FIG. 4, an air gap 105a is provided around the thermistor sintered body 103 and around the element electrode wires 104 and the sheath core wires 108 (throughout the outer surface) from the thermistor sintered body 103 to the bond portions 110. Other parts are the same as those in the first example. The same parts are represented by the same reference numerals, and descriptions thereof will be omitted. In the temperature sensor of the second example, the air gap 105a is provided between the entire outer surface of the thermistor sintered body 103 and cement 114, and the air gap 105a includes an air gap which permits displacement of the thermistor sintered body 103 and the element electrode wires 104 in the direction intersecting the axial direction of the metal tube 112. The air gap 105a of the second example corresponds to an air gap in the appended claims, and also corresponds to an enclosing air gap in the appended claims.

In the second example, as described above, the air gap 105a is provided around the thermistor sintered body 103, and in a region around the element electrode wires 104 and the sheath core wires 108 from the thermistor sintered body 103 to the bond portions 110. Therefore, even if a cooling/heating cycle is repeatedly generated in the temperature sensor 200, the element electrode wires 104 can be bent and the thermistor sintered body 103 can be displaced. As a result, shearing stress to be applied to the bond portions 110 can be further reduced, as compared with the first example, and thus the bond portions 110 can be prevented from being broken or separated.

B2. Producing Process of Temperature Sensor

The air gap 105a can be provided by the following assembly process.

Figure 5:
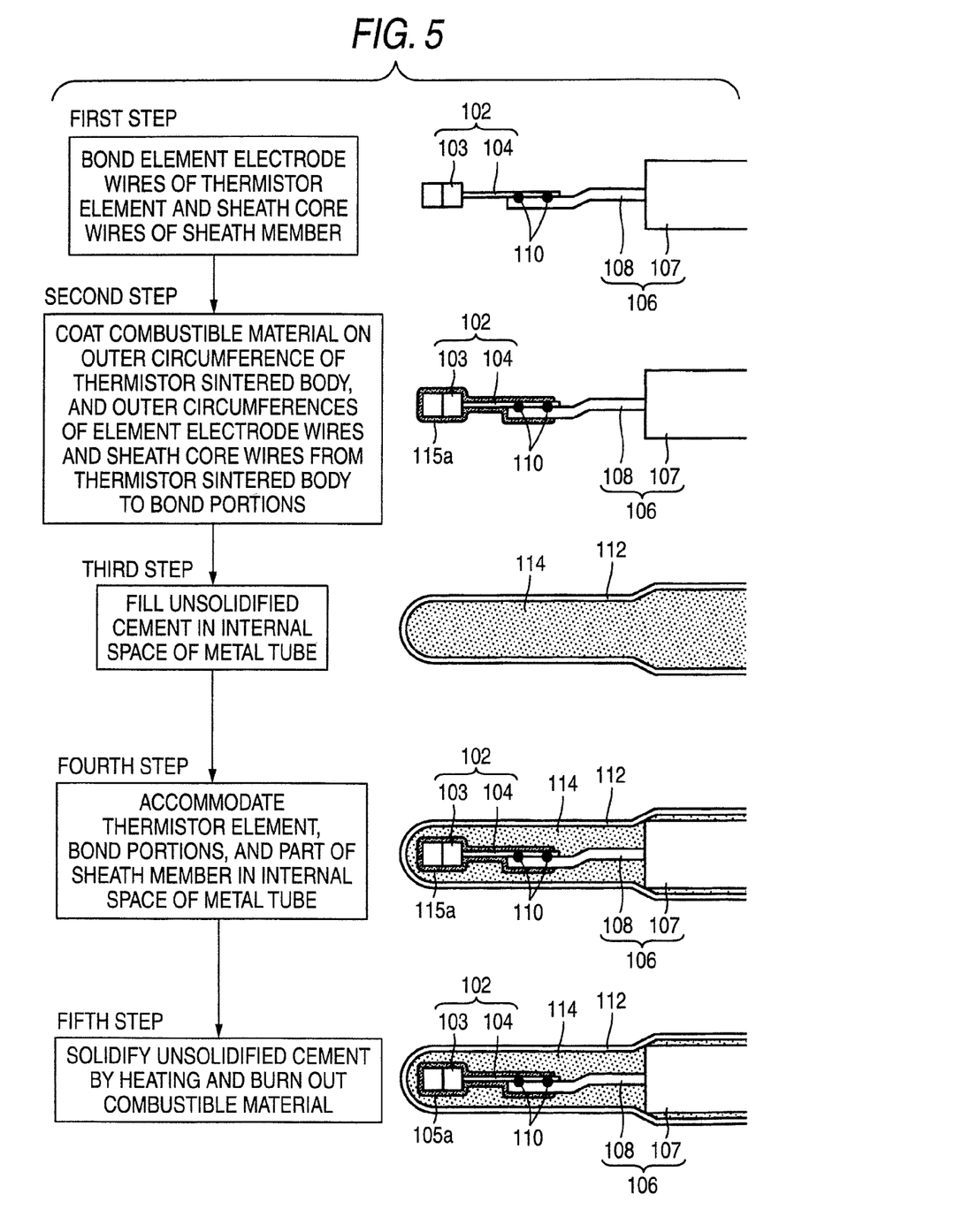
FIG. 5 is a process view showing an assembly process in a producing process of the temperature sensor of the second example.

FIG. 5 is a process view showing a part of an assembly process in a producing process of the temperature sensor of the second example. Differences between the assembly process of the temperature sensor 200 of the second example and the assembly process of the temperature sensor 100 of the first example shown in FIG. 3 are a first step and a second step. Third to fifth steps are the same as those in the first example, and thus descriptions thereof will be omitted.

In the first step, the element electrode wires 104 of the thermistor element 102 are laser spot-welded to the sheath core wires 108 which extend the front end of the sheath member 106.

Next, in the second step, a combustible material is coated on the thermistor sintered body 103 of the thermistor element 102 and the outer surface of the element electrode wires 104 and the sheath core wires 108 from the thermistor sintered body 103 to the bond portions 110. The kind of the combustible material and the method of coating the combustible material are the same as those in the first example, and thus descriptions thereof will be omitted.

Next, similarly to the first example, the third to fifth steps are executed. Thus, the air gap 105a can be provided around the thermistor sintered body 103 and in a region around the element electrode wires 104 and the sheath core wires 108 from the thermistor sintered body 103 to the bond portions 110.

C. Modification

The invention is not limited to the foregoing examples or the embodiment, but various changes and modifications may be made without departing from the scope of the invention.

In the foregoing second example, the producing process of the temperature sensor (FIG. 5) has been described as an example of a producing process of the temperature sensor 200 of the second example, which is provided with the air gap 105a around the thermistor sintered body 103 and in a region around the element electrode wires 104 and the sheath core wires 108 from the thermistor sintered body 103 to the bond portions 110. Alternatively, a combustible material may be coated only on the outer surface of the thermistor sintered body 103. In this case, it may be possible to produce the temperature sensor 100 of the first example which is provided with the air gap 105 around the thermistor sintered body 103.

In the foregoing first example, the combustible material is coated on the outer surface of the thermistor sintered body 103, but a combustible material may be coated at least on a surface toward which the thermistor sintered body 103 is displaced. Similarly, in the second example, the combustible material is coated around the thermistor sintered body 103 and in a region around the element electrode wires 104 and the sheath core wires 108 from the thermistor sintered body 103 to the bond portions 110, but a combustible material may be coated at least on a surface toward which the thermistor sintered body 103 is displaced, and a surface toward which the element electrode wires 104 and the sheath core wires 108 are bent from the thermistor sintered body 103 to the bond portions 110.

In the foregoing examples, the temperature sensor in which a part of the sheath member 106 is accommodated in the metal tube 112 fixed to the flange member 140 has been described, but the invention is not limited thereto. For example, the invention may be applied to a temperature sensor in which the sheath pipe 107 of the sheath member 106 is fixed inside the flange member 140, a bottom-closed cylindrical metal cap is welded to the outer surface of the sheath pipe 107, which protrudes from the front end of the flange member 140, in a state where the thermistor element 102 and the bond portions 110 are accommodated in the metal cap. In this case, the metal cap corresponds to an enclosing member in the appended claims.

In the foregoing examples, $Al_2O_3$ (alumina) is used for cement, but MgO, $SiO_2$, or the like may be used. In addition, in the foregoing examples, Pt/Rh alloy is used for the element electrode wires, pure Pt, Pt/Ir alloy, Pt/Ni alloy, Pt/Pd alloy, Pt or Pt alloy containing $ZrO_2$ as a dispersion reinforcing material, or the like may be used.

In the foregoing examples, the thermistor element is used as the temperature sensitive element, but the invention is not limited thereto. Alternatively, a Pt resistive element or the like may be used. When the thermistor element is used as the temperature sensitive element, the composition or the crystal structure thereof is not limited to the foregoing examples, but may be adequately changed or modified.

In the foregoing examples, the air gap 105 or 105a is provided between the entire outer surface of the thermistor sintered body 103 and cement 114, but it is not necessary to provide the air gap throughout the surface of the thermistor sintered body 103. Specifically, apart of cement 114 (holding member) may be in contact with the outer surface of the thermistor sintered body 103 (temperature sensitive body) insofar as an air gap is provided between the outer surface of the thermistor sintered body 103 (temperature sensitive body) and cement 114 (holding member) to permit at least displacement of the thermistor sintered body 103 (temperature sensitive body) in a direction intersecting the axial direction of the metal tube 112 (enclosing member). The adjustment of the region where the air gap is to be formed can be realized by adjusting the region, at which the combustible material is to be coated, in the producing process of the temperature sensor of each of the foregoing examples.

The invention may also be applied to a temperature sensor that is provided in a flow channel through which a liquid, such as water or oil, flows as a fluid to be measured, as well as the exhaust temperature sensor.

What is claimed is:

1. A temperature sensor comprising:
   a temperature sensitive element that has a temperature sensitive body and an element electrode wire;
   a sheath member that has an external cylinder, the sheath member encompassing a sheath core wire to be bonded to the element electrode wire in the external cylinder;
   an enclosing member that has a bottom-closed cylindrical shape extending in an axial direction with a front end closed, at least the temperature sensitive element and a bond portion of the element electrode wire and the sheath core wire being accommodated in an internal space of the bottom-closed cylindrical shape, and
   a holding member that is filled in the internal space,
   wherein an air gap is provided at least between an outer surface of the temperature sensitive body and the holding member so as to permit displacement of the temperature sensitive body in a direction intersecting the axial direction of the enclosing member.

2. The temperature sensor according to claim 1,
   wherein the air gap is provided between the outer surface of the temperature sensitive body and the holding member, and between the holding member and outer surfaces of the element electrode wire and the sheath core wire from the temperature sensitive body to the bond portion so that the air gap permits displacement of the temperature sensitive body and the element electrode wire in the direction intersecting the axial direction of the enclosing member.

3. The temperature sensor according to claim 2,
   wherein an enclosing air gap is provided between an entire outer surface of the temperature sensitive body and the holding member, and the enclosing air gap includes the air gap.

4. The temperature sensor according to claim 1,
   wherein an enclosing air gap is provided between an entire outer surface of the temperature sensitive body and the holding member, and the enclosing air gap includes the air gap.

5. A method of producing a temperature sensor,
   wherein the temperature sensor includes
   a temperature sensitive element that has a temperature sensitive body and an element electrode wire,
   a sheath member that has an external cylinder, the sheath member encompassing a sheath core wire to be bonded to the element electrode wire in the external cylinder,
   an enclosing member that has a bottom-closed cylindrical shape with a front end closed, at least the temperature sensitive element and a bond portion of the element electrode wire and the sheath core wire being accommodated in an internal space of the bottom-closed cylindrical shape, and
   a holding member that is filled in the internal space, and
   the method comprising:
   coating a combustible material at least on an outer surface of the temperature sensitive body;
   bonding the element electrode wire of the temperature sensitive element, in a state in which the temperature sensitive body is coated with the combustible material, and the sheath core wire of the sheath member;
   accommodating at least the temperature sensitive element and the bond portion of the element electrode wire and the sheath core wire in the internal space of the enclosing member; and
   filling the unsolidified holding member in the internal space of the enclosing member, solidifying the unsolidified holding member by heating, and burning out the combustible material to provide an air gap at least between the outer surface of the temperature sensitive body and the holding member.

6. The method according to claim 5,
   wherein, in the coating of the combustible material, the combustible material is coated on the outer surface of the temperature sensitive body, and outer surfaces of the element electrode wire and the sheath core wire from the temperature sensitive body to the bond portion, and
   in the providing of the air gap, the combustible material is burned out to provide an air gap between the outer surface of the temperature sensitive body and the holding member, and between the holding member and outer surfaces of the element electrode wire and the sheath core wire from the temperature sensitive body to the bond portion.

7. A method of producing a temperature sensor,
   wherein the temperature sensor includes
   a temperature sensitive element that has a temperature sensitive body and an element electrode wire,
   a sheath member that has a metallic external cylinder, the sheath member encompassing a sheath core wire to be bonded to the element electrode wire in the metallic external cylinder in a state where electrical insulation is provided between the sheath core wire and the element electrode wire,
   an enclosing member that has a bottom-closed cylindrical shape with a front end closed, at least the temperature sensitive element and a bond portion of the element electrode wire and the sheath core wire being accommodated in an internal space of the bottom-closed cylindrical shape, and
   a holding member that is filled in the internal space, and
   the method comprising:
   bonding the element electrode wire of the temperature sensitive element and the sheath core wire of the sheath member;
   coating a combustible material on at least an outer surface of the temperature sensitive body of the temperature sensitive element after the bonding;
   accommodating at least the temperature sensitive element and the bond portion of the element electrode wire and the sheath core wire in the internal space of the enclosing member; and
   filling the unsolidified holding member in the internal space of the enclosing member, solidifying the unsolidified holding member by heating, and burning out the combustible material to provide an air gap at least between the outer surface of the temperature sensitive body and the holding member.

* * * * *